UNITED STATES PATENT OFFICE.

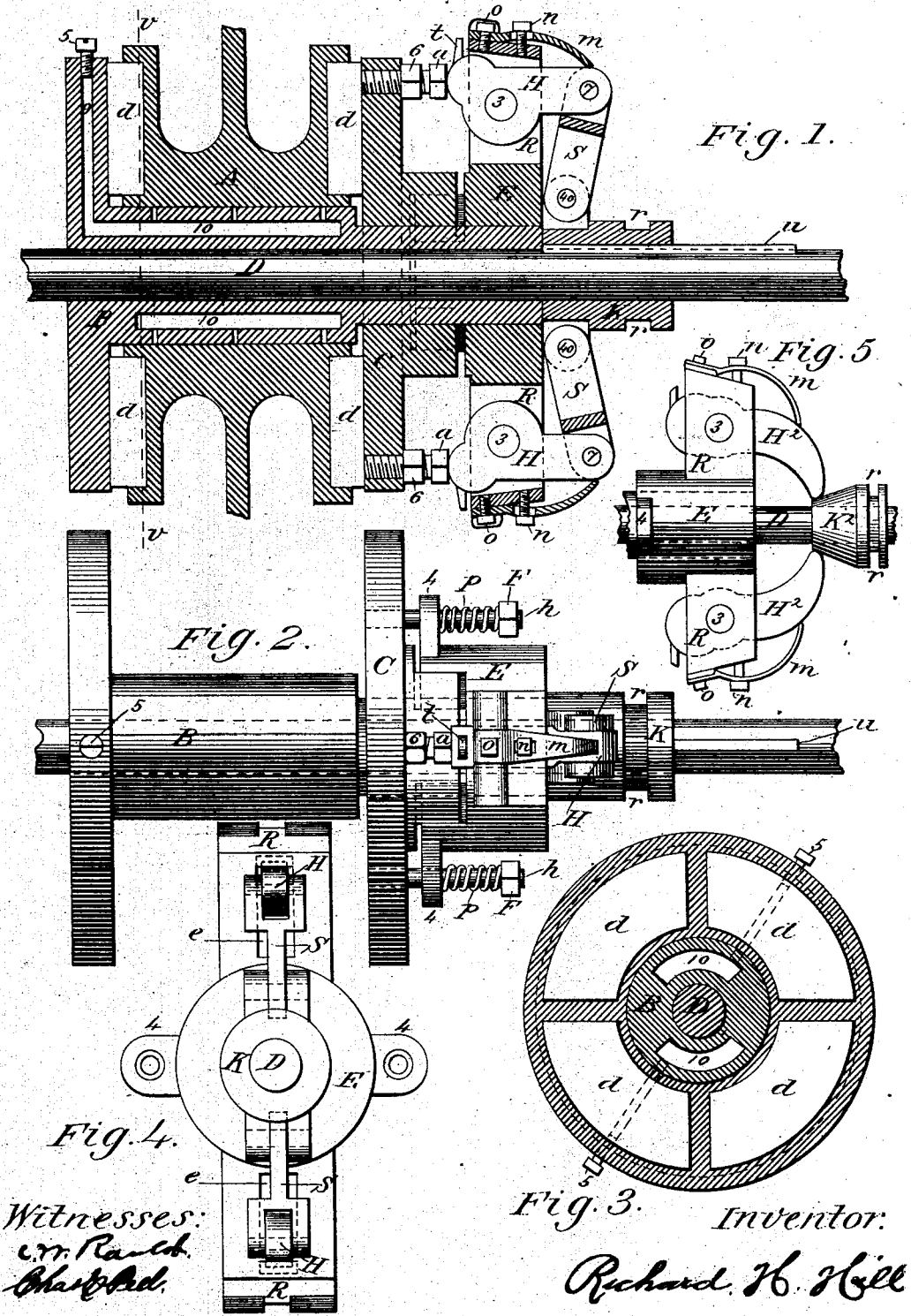

RICHARD H. HILL, OF NEW HAVEN, CONNECTICUT.

FRICTION-COUPLING DEVICE.

SPECIFICATION forming part of Letters Patent No. 236,814, dated January 18, 1881.

Application filed August 30, 1880. (Model.)

*To all whom it may concern:*

Be it known that I, RICHARD H. HILL, of the city of New Haven, county of New Haven, and State of Connecticut, have invented a new Improved Friction-Coupling Device for the Transmission of Power, of which the following is a specification.

The purpose of this invention is to connect and disconnect motive powers—viz., engines and water-wheels, &c.; also, to start and stop machinery with an easy even motion.

Wherein my invention differs from others of this class is the application of motive friction upon the opposite ends of the hub of the loose pulley, gear, clutch-coupling, drum, or wheel simultaneously without apparent end-thrust on journal-boxes and collars; also, the peculiar arrangement and construction of parts to provide against the wear of the loose pulley, gear, clutch-coupling, drum, or wheel on its journal by properly lubricating same; also, to avoid the binding and sticking of friction-surfaces when pressure on same is relieved.

In the accompanying drawings, Figure 1 is a longitudinal section of my invention, with shaft in elevation. Fig. 2 is a top view of my invention with the hub of the loose pulley, gear, clutch-coupling, drum, or wheel detached. Fig. 3 is a transverse section taken on the line *v v*, Fig. 1. Fig. 4 is an end view of the sliding clutch-collar and stationary hub with spring mechanism detached. Fig. 5 is a side view of a modification of my invention.

Similar letters and figures refer to similar parts throughout the several views.

D represents a shaft, to which the flanged collar B is firmly secured by feather and spline, or in other suitable manner.

A represents the hub of a loose pulley, clutch-coupling, gear, drum, or wheel, journaled upon the collar B. The inside face of flange on collar is one of the friction-surfaces of this mechanism. C represents a sliding flanged collar, the face of flange forming the other friction-surface of this mechanism. The said sliding flanged collar C is provided with ordinary clutch-coupling projections, which intercept corresponding projections of the hub E, said hub being securely fastened to the collar B.
Upon the periphery of the hub E are two or more lugs or projections, R, having apertures *e*. Between the sides of said apertures are fitted the levers H, pivoted upon the bolts or pins 3. The outer ends of levers H are pivoted upon the bolts or pins 7, between the ears of the link-levers S. The other ends of said link-levers S are pivoted on the bolts or pins 40, between ears on the periphery of the sliding collar K, fitted to slide upon the feather U. The said sliding collar K is provided with a groove, *r*, into which is fitted the end of a shifting lever to move said collar K along upon the shaft.

Upon the ends of the lugs R are fitted the springs *m*, which are held in place by the screws *o* and projections on lugs R upon opposite sides of said springs *m*. The said springs *m* are constructed with oblong slots, through which pass adjusting-screws *n* and enter end of lugs R. The ends of springs *m* rest upon the outer ends of levers H, and their object is to keep levers H and S in their proper places. The pressure is adjustable for the different speeds by the screws *n*.

The inner ends of levers H are so constructed as to engage the ends of screws *a*, or equivalent adjustable mechanism, fitted to the flange of the sliding flanged collar C. The said screws *a* are provided with check-nuts 6, to securely hold screws *a* in place when once adjusted. The inner ends of levers H are of such shape that when the outer ends thereof are thrown outward the inner ends act as cams against the head of screws *a* and force the sliding flanged collar C along the flanged collar B. The inner ends of levers H are also provided with projections *t*, which limit the movement of the sliding ring K by coming in contact with the lugs R.

The hub E is provided with lugs 4, having cylindrical apertures, through which pass the rods or bolts *h*, which are fastened to the sliding flanged collar C. The lugs 4 are countersunk for the reception of one end of a spiral spring, P, which is wound around rods *h*. To the end of said rods *h* are fitted nuts F, by which the pressure of springs P to move the flanged collar C in the direction of the hub E is regulated. The object of said springs is to more readily release the friction-surfaces when the pressure on the same is withdrawn. When the parts are in position shown in Fig. 1 the friction-surfaces are in contact. When the friction-surfaces are not in contact the sliding clutch-collar K is at as great a distance from the end of hub E as the projections $t$ on levers H, when in contact with lugs R, will admit, and the sliding flanged collar C is at its greatest distance from the flange on collar B.

The operation of my invention is thus: Move the sliding clutch-collar K along the shaft until it comes in contact with hub E, which will cause the outer ends of levers H to move from and inner ends to move toward the shaft D. The inner ends of said levers H, which are in contact with the head of screws A, act upon the same as cams, imparting to the sliding flanged collar C a movement along the collar B, thereby binding the hub of the loose pulley, gear, clutch-coupling, drum, or wheel A between the friction-surfaces of the flanged collar B and sliding flanged collar C. If the shaft is revolving, the motion will thereby be communicated to the loose pulley, gear, clutch-coupling, drum, or wheel.

Under high rates of speed and heavy pressure on friction-surfaces there are other substances that are preferable to cast-iron on cast-iron. To provide for this the hub of loose pulley, gear, clutch-coupling, drum, or wheel is provided with cavities, into which can be properly fastened blocks $d$, of wood, compressed paper, leather, or other suitable substance.

To properly lubricate the journal of the loose pulley, gear, clutch-coupling, drum, or wheel the collar B is provided with one or more chambers, 10, which are filled with lubricant through channels 9. Said channels 9 are closed by plugs or screws 5. The lubricant is delivered on the journal through holes connecting chambers 10 with the periphery of journal.

The means for operating the pivoted levers H shown in Fig. 5 consists of a sliding conical clutch-collar, $K^2$, which, when moved along the shaft in the direction of hub E, acts as a wedge upon the outer ends of levers $H^2$ and forces them from the shaft. When the conical clutch-collar is drawn back the springs $m^2$, acting upon the levers $H^2$, force them toward the shaft D.

The number of levers S and H, screws $a$, springs $m$, and lugs R vary with different-sized friction devices, the number being proportioned to the load the friction device has to carry.

From the foregoing it is evident that many slight changes in the construction and arrangement of parts and materials employed may be resorted to without departing from the spirit of my invention, and hence I would have it understood that I do not limit myself to the exact construction shown and described.

Having thus described my invention, I claim as new and desire to secure by Letters Patent—

1. In a friction-coupling device, the combination, with a shaft and a sliding collar mounted thereon, and provided with rods having spiral springs and adjusting-nuts, of a hub secured to said shaft, and having projections provided with apertures, through which said rods may pass, whereby said sliding collar is drawn toward said hub when relieved from pressure, substantially as described.

2. In a friction-coupling device, the combination, with the shaft D, of the fast collar B, loose pulley or wheel A, sliding collar C, having screws $a$, fixed hub E, having lugs or arms R, cam-levers H, pivoted to said arms, springs $m$, screws $n$, links S, and sliding clutch-collar K, the said hub E being adapted to engage and rotate the said collar C, all substantially as set forth.

RICHARD H. HILL.

Witnesses:
GEO. B. WALTON,
ALBERT M. HILL.